Feb. 10, 1959

K. A. ANULF 2,873,323

AUTOMATIC TELECOMMUNICATION SYSTEMS

Filed Aug. 12, 1955

2 Sheets-Sheet 1

INVENTOR
Karl Arne Anulf

BY Strauch, Nolan & Diggins

ATTORNEYS

AUTOMATIC TELECOMMUNICATION SYSTEMS

Filed Aug. 12, 1955 2 Sheets-Sheet 2

INVENTOR
Karl Arne Anulf

BY Shauch, Nolan + Diggins
ATTORNEYS 2,873,323
Patented Feb. 10, 1959

2,873,323

AUTOMATIC TELECOMMUNICATION SYSTEMS

Karl Arne Anulf, Nasbypark, Sweden

Application August 12, 1955, Serial No. 528,022

Claims priority, application Sweden August 13, 1954

7 Claims. (Cl. 179—175.2)

Figure 1:
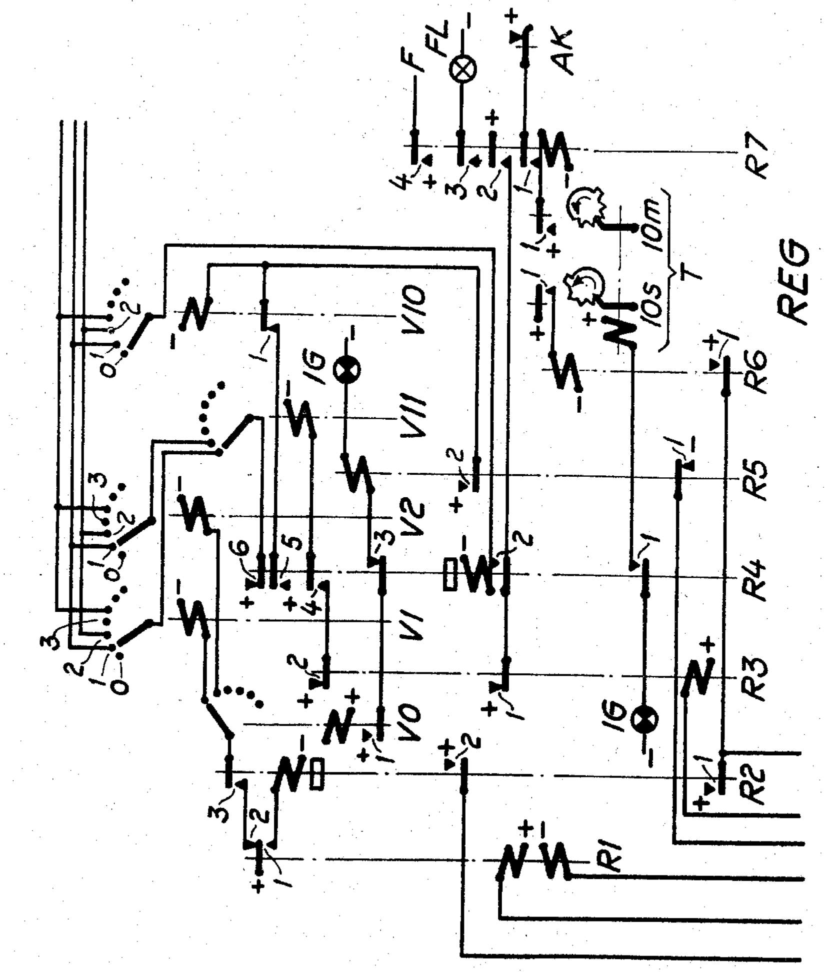

The present invention has regard to an arrangement in automatic telecommunication systems comprising selectors for establishing connections and controlling members arranged to cause the setting of engaged selectors in dependence of incoming switching signals by means of controlling signals controlling the selectors, which are provided with means for returning to the controlling members a return signal as a criterion on the operation of the respective selector in dependence of a controlling signal.

Such systems, such as telephone and telegraph offices, were previously supervised continuously by human personnel checking during all the 24 hours the safe operation of the switching equipment.

As the modern telecommunication systems are materially more reliable in operation than older systems it has been possible to reduce the human supervision to a substantial extent, and a great number of exchanges and offices are not supervised at all and the remaining exchanges are only supervised during a part of the day.

Due to the fact that the human supervision is reduced to a minimum there is a need for means for automatically identifying defective switching courses and blocking defective switching members and connections. Relatively simple faults may sometimes cause great obstacles for the traffic, and at least during reduced traffic, even completely block different traffic routes.

A fault in a connection usually shows the same characteristics as if an overloading of the traffic route were present, in that the call can not be switched forward. Hitherto it has been an unsolved problem to make a distinction between these two kinds of disturbances. In the past, attempts have been made to solve the problems by recording those switching trials, which have not been completed immediately and to find defective switching members by statistic analysis of the extensive material obtained. The faults which may be detected in this way will of course remain and cause traffic disturbances for an extended period of time until they are found.

It is an object of this invention to provide a simple arrangement, by means of which switching courses in which faults occur can be identified and distinguished from such switching courses that cannot be completed due to the occurence of denied calls.

The establishment of a connection takes place in a predetermined sequence, and the various phases of the calls in the modern systems are controlled by controlling members operating the switching members. When an operation has been completed, a return signal, usually termed receipt signal, gives an indication that the operation has been duly concluded before the next operation is started. In the case of a fault this return signal will fail to be received while in the case of a denied call the return signal will be received after some time. This time, however, may be so long that the call has been abandoned and concluded before the condition of denied call is broken off.

The arrangement according to the present invention is characterized by the fact that it comprises means for effecting in dependence of an incoming switching signal a holding of engaged selecting means independently of the maintenance of the switching condition initiating the switching course and for releasing this holding in dependence of a corresponding return signal, and that it further comprises a time measuring device for measuring the space of time of the holding condition and effecting a fault indication at the occurrence of such a space of time that considerably exceeds the likely average delay for denied calls.

Due to the fact that the operation time of the time measuring device is so chosen that it substantially exceeds the normal or average delay for denied calls, a denied call can be distinguished from a fault with almost complete certainty, since a denied call would have been broken off before the operation of the time measuring device.

If there is an average delay of 15 seconds for denied calls only $6\times10^{-23}$ of the calls will still remain after ten minutes at a normal distribution of the delays.

If a fault indication takes place after this time and it is assumed that the percentage of faulty connections is 0.04% only one indication of $6\times10^{-19}$ will be caused by denied calls, which number is quite negligible.

Figure 2:
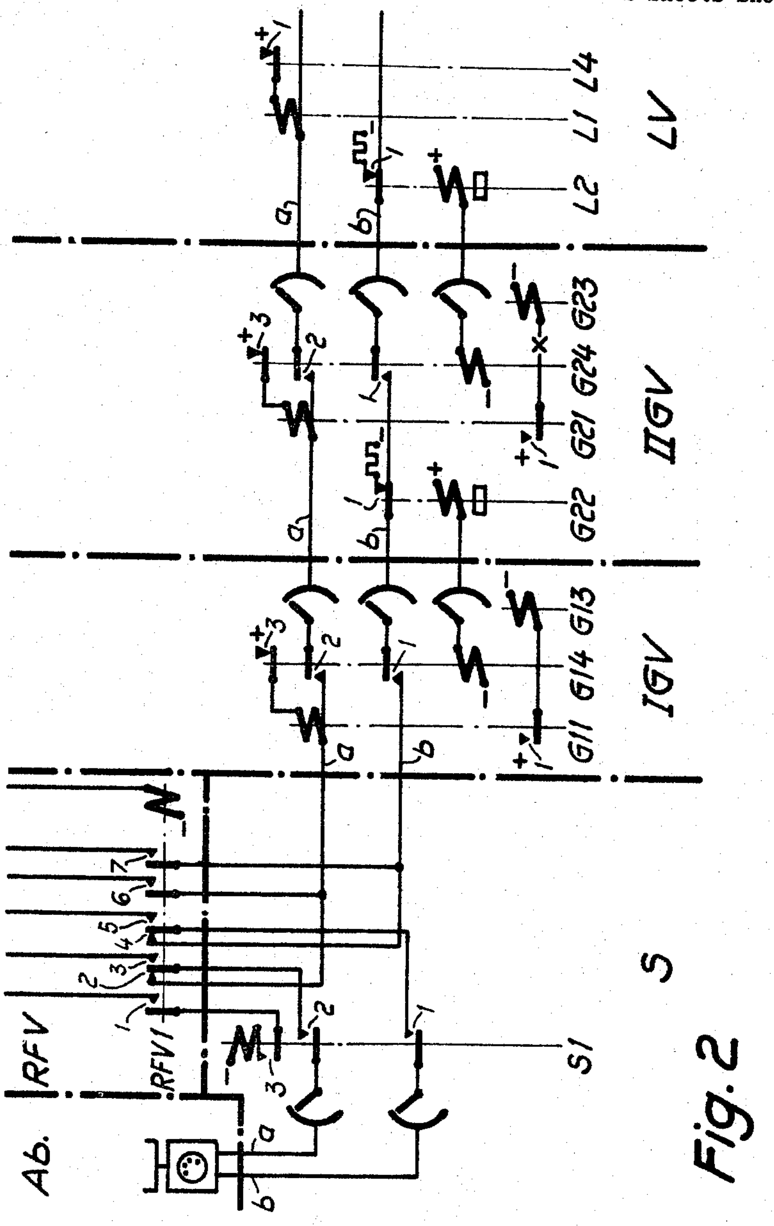

An embodiment of the invention will be more closely described in connection with Figures 1 and 2 on the drawings, which are to be placed with Fig. 1 on the top of Fig. 2. The invention is here applied to a register-controlled telephone system, in which the selectors are controlled by impulses from a register containing in a known manner the controlling members for the selectors. A*b* designates a calling subscriber's set connected in usual manner together with other subscribers' sets to the contact bank of a line finder S. IGV, IIGV and LV designate selector stages, that is first group selector, second group selector and final selector respectively, which are arranged in a well known manner. A register is designated REG, and RFV is a connecting member for the register such as a register-preselector. In the selector stages controlled by the register the aforesaid return signal consists of the connection of minus potential to the *b*-conductor, which signal is momentarily transmitted from the succeeding selecting member in connection with the connection through a selecting stage.

A call from the subscriber A*b* is connected through the line finder S in the usual manner, so that the connecting relay S1 is operated. A free register REG is hunted out and connected in a known manner by the operation of relay RFV1 in the register-preselector. (The operation circuits of relays S1 and RFV1 are not shown on the drawing.)

When the register REG has been connected, the impulse relay R1 is operated by current from plus through the upper winding of relay R1, contacts RFV1–3 and S1–2, the *b*-conductor of the subscriber A*b*, through the telephone set A*b*, the *a*-conductor, contacts S1–1 and RFV1–5 and through the lower winding of relay R1 to minus. The slow-releasing holding relay R2 is thereby operated by current through contact R1–1.

The operation of relay R2 has as a result that (1) this relay takes over the holding from the register of the register-preselector by a plus potential connected through contact R2–1 and (2) that a holding circuit for relay S1 in the line finder S is formed from plus through contact R2–2, contacts RFV1–1 and S1–3 and through the winding of relay S1 to minus, whereby the subscriber is kept connected to the line finder S.

The digits dialled by the subscriber A*b* are now stored in a known manner in the register REG. Under the cooperation of a selector V0 the first digit is registered by the selector V1, the second digit by selector V2 etc.

Then the operation of the selectors is started. When the first digit has been dialled a circuit is closed from contact V0–1 through brake contact R4–3, through the winding of the impulse transmitting relay R5 to an impulse generator IG.

Relay R5 now starts to alternately operate and release in time to the impulses from the impulse generator, whereby the selector IGV and the counting member V10 are operated stepwise in synchronism. The selector IGV is operated in the following way: relay G11 in selector IGV obtains current impulses from minus at contact R5–1, through contact RFV1–6, through the winding of relay G11 and through contact G14–3 to plus. Hereby the selector magnet G13 will operate in time to the impulses supplied by contact G11–1. The selector V10 is operated by impulses transmitted by contact R5–2.

When selector V10 has reached the position corresponding to the digits registered by the selector V1 the controlling relay R4 operates by current from plus at contact R4–6 through field contact 1 in the selector V11, a field contact in selector V1 corresponding to the registered digit, a corresponding field contact in selector V10 through the winding of relay R4—to minus. Relay R4 obtains holding current through its contact R4–2 and through contact R3–1 on relay R3.

Relay R4 breaks the impulse circuit for relay R5 at contact R4–3, whereby the operation of selector IGV, which now has been set on the desired decade, is stopped.

Furthermore impulses are connected through contact R4–1 to a time measuring device T, arranged to operate at two different times, one after ten seconds and the other after 10 minutes for example.

The first mentioned time is so calculated as to be less than the likely average delay for denied calls but yet exceeds the normal switching time, while the other time considerably exceeds said average delay. The selector V11, which successively connects the translating circuits for the different switching stages is advanced by current through make contact R4–4. The counting member V10 is restored by contact R4–5, and the translating circuit is opened by contact R4–6. The register now waits in this position for the return signal.

The selector IGV, the numerical setting of which was concluded when the impulse sending was finished in the register, has in the meantime started the hunting for a free line to the selector IIGV. When such a line is seized relay G14 in selector IGV is operated and connects the speech conductors *a* and *b*. Also relay G22 in selector IIGV is operated in series with relay G14. However, relay G22 is slow-operating and during the delay a return signal is sent to the register, which return signal consists of the connection of minus potential to the *b*-conductor through break contact G22–1. The signal is received by relay R3, which is operated. Hereby the break contact R3–1 is opened and relay R4 releases.

On the operation of relay R4 the time measuring device T is restored by the opening of contact R4–1, and the next switching stage can be operated.

It there had been a denied call in selector IGV and the delay had exceeded 10 seconds the time measuring device T would have operated its contact T1, whereby relay R6 had operated and held the register-preselector RFV and thereby the engaged switching members for current through make contact R6–1.

If the call from the subscriber A*b* is concluded before the condition of denied call is broken off the relay R1 is released and so is relay R2 after its time of delay. When contact R2–2 on relay R2 is opened, the current for relay S1 in the line finder S is interrupted. Relay S1 releases and is de-energized and releases the calling subscriber from the line finder.

When the condition of denied call ceases, a return signal is received and relay R4 releases in a manner described above. Hereby the time measuring device T is restored, relay R6 releases, the register-preselector RFV loses its holding current and all the engaged switching members are released.

It may now be assumed that the establishment of the connection has been completed in a normal way through the selector IGV and that accordingly the setting of selector IIGV for connecting the final selector LV has to take place. Further it may be assumed that the selector IIGV is faulty due to a rupture in the controlling circuit of the operating magnet of the selector, which rupture is indicated by a cross on the drawing.

The relay R5 in the register transmits impulses in the same way as on the setting of the group selector IGV, which impulses are received by relay G1 in group selector IIGV. When the impulse sending is concluded, relay R4 is operated in the manner described above, so that the time measuring device T is energized again. Due to the fault the selector is not operated, and accordingly no return signal can be transmitted. When 10 seconds have lapsed the switching course is locked independently of whether the call has been concluded or not, and after 10 minutes the time measuring device operates fault indicating relay R7 through contact T–2. This relay lights the fault indicating lamp F1 belonging to the register and transmits through contact R7–4 a fault indicating signal to supervising personnel on the same or another office. Relay R7 besides warrants the holding of relay R4 and contact R7–2, so that the switching condition at the instant of fault indication cannot be unduly changed.

The fault indication remains until the restoring switch AK is operated, and during this time the faulty switching member is automatically blocked. In the same way as previously described the calling subscriber is released when the call ceases, that is when the micro-telephone is replaced. By studying the position of the selector V11 the fault can be easily located, so that either the required reparation can be carried out immediately or, if the fault is more serious, the faulty switching member can be taken out of traffic in the usual way.

In the embodiment described above the time measuring device is arranged to operate at two different points of time, that is first after a shorter time for effecting a holding of the engaged switching members and then, after a longer time, for causing a fault indication. This is advantageous with regard to the fact that a calling subscriber frequently does not wait at a denied call until the condition of denied call ceases but concludes the call before then, e. g. after 20 seconds. Although it is possible within the scope of the general idea of the invention to have the time measuring device operate only with the longer time and to allow the holding to take place with no delay, this will, however, involve the disadvantage that switching members engaged for a connection, in which a denied call condition is occurring, will be kept engaged until this condition ceases on the interruption of the call before the cessation of the denied call condition, and this will of course reduce the possibilities to obtain connection through the system. The first operating time of the time measuring device should accordingly be so chosen that it exceeds the normal time for establishing a connection but is less than the time, for which it may be assumed that a subscriber normally waits for a speech connection. In every case this time should be materially shorter than the time measured for the fault indication. On the other side it is possible to equip only a small number of controlling members, e. g. only one register, with a time measuring device and arrangements for holding and releasing engaged selecting members in systems, where a plurality of controlling members are alternately accessible for the establishment of connections, for instance if the controlling members are situated in alternately connectable registers. These controlling members or this register respectively will then act as a testing device, which will make a test on the different connections successively as they are connected to it. In such a case an extended occupation of the switching members will of course be of comparably small importance. The possibility to provide e. g. only one register in a telephone office with an arrangement according to the invention is particularly important when the invention is applied to older existing systems, in which the required circuits and elements then can be introduced in a simple and inexpensive way.

In the described embodiment the controlling members (the register) is connected to one single point on the connection, and the arrangement according to the invention will thereby be common for all the succeeding switching stages. In systems having separate controlling members for each selecting stage or having several registers along the route the different sets of controlling members or the different registers may of course be provided with individual arrangements according to the invention. It will then also be possible to release all the preceding switching stages on the occurrence of a fault according to the principle described above for releasing the line finder and the calling subscriber in the shown embodiment.

A further feature of the described embodiment is that the return signals arrive when the selector setting in the respective switching stage has been concluded and thus act as signals indicating that the register may continue the signal sending for setting the next succeeding switching stage. The invention is, however, as well applicable to systems in which the selectors transmit return signals during their setting consisting of so-called back impulses. In such systems the failure of back impulses will cause fault indication in a way, which in point of principle is the same as in the described embodiment. The time measuring device is then suitably started by starting relays or the like which are operated for the transmission of an operating signal to the selector.

Particularly in non-supervised offices and exchanges it may be advantageous not to obtain durable holding of faulty connections at each occurrence of a fault but instead to arrange the time measuring device to advance a counting member for each operation, which counting member after having registered the occurrence of a fault releases the connection by automatically operating a contact corresponding to the release contact AK. The counting member can easily be arranged in such a way, that it transmits a fault signal to a superior office after a predetermined number of fault indications and simultaneously fails to release the connection, whereby a mender can identify the faulty connection at an inspection.

I claim:

1. In a telecommunication system, selectors for establishing connections between calling and called circuits, control means for operating said selectors, means for connecting said control means to one of said circuits in response to calling condition on said one circuit, means in said selectors for sending return signals to said control means in case of proper function of the selectors, holding means for holding engaged selectors in engaged condition irrespective of the continuance of the calling condition on said one circuit, means for releasing said holding means in response to said return signals, timing means for measuring the duration of the operated condition of said holding means, and indicating means operable by said timing means in the case that said duration exceeds a predetermined time.

2. In a telecommunication system, selectors for establishing connections between calling and called circuits, control means for operating said selectors, means for connecting said control means to said circuits in response to calling condition on said circuits, means in said selectors for sending return signals to said control means in case of proper function of the selectors, holding means for holding engaged selectors in engaged condition irrespective of the continuance of the calling condition on said circuits, means for releasing said holding means in response to said return signals, timing means for measuring the duration of the operated condition of said holding means, indicating means operable by said timing means in the case that said duration exceeds a predetermined time, and means operable by said timing device concomitantly with operation of said indicating means to render ineffective said means for releasing the holding means in response to return signals.

3. In a telecommunication system, selectors for establishing connections between calling and called circuits, control means for receiving switching signals and sending control signals to said selectors for setting said selectors in accordance with the switching signals, means for connecting said control means to one of said circuits in response to calling condition on said one circuit, means in said selectors for sending return signals to said control means in case of proper operation of the selectors, holding means responsive to the transmission of said control signals for holding engaged selectors in engaged condition irrespective of the continuance of the calling condition on said circuit, means responsive to said return signals to release said holding means, timing means for measuring the duration of the operated condition of said holding means, and indicating means operable by said timing means in the case that said duration exceeds a predetermined time.

4. In a telecommunication system, selectors for establishing connections between calling and called circuits, control means for receiving switching signals and for sending control signals to said selectors for setting said selectors in accordance with the switching signals, means for connecting said control means to one of said circuits in case of calling condition on said one circuit, means in said selectors for sending return signals to said control means in case of proper function of the selectors, timing means, means for starting the operation of said timing means in response to the transmission of said control signals from the control means, holding means operable by said timing means after a first predetermined interval to hold engaged selectors in engaged condition irrespective of the continuance of the calling condition on said circuit, means responsive to said return signals to release said holding means if operated and to reset said timing means, and indicating means operable by said timing means after a second predetermined interval longer than said first predetermined interval.

5. In a telecommunication system including calling and called lines, selectors for establishing connections between said calling and called lines, a plurality of control means for controlling operation of said selectors, means for connecting any one of said control means to one of said lines in response to calling condition on said line, means in said selectors for sending return signals to said control means in case of proper operation of the selectors, at least one of said control means comprising in combination: holding means for holding engaged selectors in engaged condition irrespective of the continuance of the calling condition on said one line, means responsive to said return signals to release said holding means, timing means for measuring the duration of the operated condition of said holding means, and indicating means operable by said timing means if said duration exceeds a predetermined time.

6. In a telecommunication system including calling and called lines, selectors for establishing connections between said calling and called lines, registers for controlling operation of the selectors, connecting means operative in response to the initiation of a call on one of said lines serving as a calling line to seize a register and to connect selectors to the seized register, relay means under control of the said calling line and responsive to the seizure of a register to establish a first holding circuit for said connecting means, means in said selectors for sending return signals to the said seized register in case of proper function of the selectors, means in said seized register for establishing a second holding circuit for said connecting means, said second holding circuit being independent of the first holding circuit, means responsive to said return signals to release said means for establishing a second holding circuit, timing means for measuring the duration of the operated condition of said means for establishing a second holding circuit, and indicating means operable by said timing means if said duration exceeds a predetermined interval.

7. In a telecommunication system, selectors for establishing connections between calling and called circuits, control means for operating said selectors, means responsive to the initiation of a call from one of said circuits to connect said control means to said one circuit, means in said selectors for sending return signals to said control means in case of proper function of the selectors, holding means for holding engaged selectors in engaged condition irrespective of the continuance of the calling condition on said one circuit, means responsive to said return signals to release said holding means, timing means for measuring the duration of the operated condition of said holding means, indicating means operable by said timing means if said duration exceeds a predetermined interval, and means responsive to the cessation of the calling condition on said one circuit to disconnect said one circuit from said selectors and control means irrespective of whether said holding means is in operated condition.

References Cited in the file of this patent

UNITED STATES PATENTS

| | | |
|---|---|---|
| 2,508,052 | Williford | May 16, 1950 |
| 2,513,049 | Powell | June 27, 1950 |
| 2,542,800 | Dehn et al. | Feb. 20, 1951 |
| 2,635,148 | Shepherd | Apr. 14, 1953 |
| 2,657,271 | Henry | Oct. 27, 1953 |